April 15, 1947.  R. C. YOUNG  2,419,184
FEATHER TRIMMER
Filed Nov. 19, 1945  2 Sheets-Sheet 1

INVENTOR.
RAYMOND C. YOUNG
BY
Arthur R. Woodfolk
ATTORNEY.

April 15, 1947.　　　　R. C. YOUNG　　　　2,419,184
FEATHER TRIMMER
Filed Nov. 19, 1945　　　　2 Sheets-Sheet 2

INVENTOR.
RAYMOND C. YOUNG
BY
Arthur R. Woolfolk
ATTORNEY.

Patented Apr. 15, 1947

2,419,184

UNITED STATES PATENT OFFICE 2,419,184

FEATHER TRIMMER

Raymond C. Young, Manitowoc, Wis.

Application November 19, 1945, Serial No. 629,584

7 Claims. (Cl. 219—29)

This invention relates to feather trimmers for missiles such as arrows, darts and the like.

Objects of this invention are to provide a novel form of feather trimmer for arrows, darts and the like which is so constructed that it will take any size shaft or dart and any size nock or dart and which is so arranged that it will center the shaft and nock or the dart and assure the operator of the correct alignment of the arrow or dart with reference to the trimming portion of the device.

Further objects are to provide a feather trimmer for arrows, darts and the like which has a trimming member adapted to be heated to a degree sufficient to burn the feathers to the exact contour of the trimming member and which is arranged to allow for adjustment both of a holding means and centering means for the arrow or dart and also for independent adjustment of the trimming member so that any desired shape may be imparted to the feathers and so that the device will accommodate any size of arrow or dart or any size of feathers desired.

Further objects are to provide a very simple type of apparatus which is so made that a step-down transformer is employed for heating the trimming member so that although the operator may inadvertently touch some live part of the trimming member or its adjustable supporting means, he nevertheless will not receive any appreciable shock, all of the higher voltage portions of the apparatus being inaccessible to the operator.

An embodiment of the invention is shown in the accompanying drawings, in which.

Figure 1:
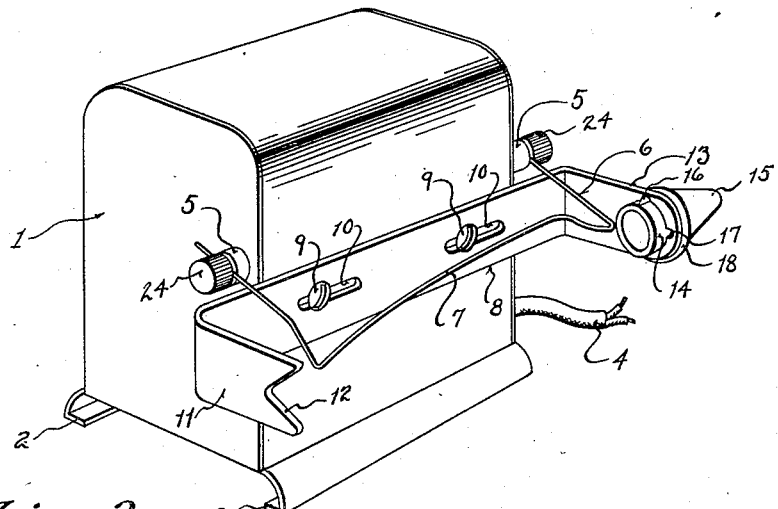
Figure 1 is a view of the feather trimmer.

Referring to the drawings, it will be seen that the feather trimmer is a unitary device which consists of a housing 1 of metal supported in any suitable way, as by means of the feet portions 2. The housing encloses a step-down transformer indicated generally by the reference character 3 whose primary leads are indicated by the reference character 4 and whose secondary terminals are connected to the binding posts 5 which binding posts constitute the supporting means for the side arms 6 of the trimming member 7. The primary leads 2 may terminate in a plug or any other suitable connecting member whereby they may be connected into the house supply mains.

It is to be noted that below and adjacent the supporting members 5 for the trimmer 7 is located in adjustable frame 8 which is held in place by means of a plurality of screws 9 which press through slots 10. This construction is such that the slots and screws lie in a plane which is parallel to a plane passing through the supporting members 5. Thus no matter in which direction the frame 8 is adjusted when the screws 9 are loosened, the frame nevertheless will be in parallelism with a plane passing through the supporting members 5.

One end arm 11 of the adjustable frame 8 is provided with a V-shaped notch 12, the other end arm being indicated by the reference character 13. The arm 13 is provided with an aperture which receives the hub portion 14 of a conically recessed transparent member 15. The member 15 is preferably formed of glass and may be locked to the arm 13 in any suitable manner as by means of ears 16. The ears 16 are passed through the slots 17 and thereafter the member 15 is given a quarter turn to thus lock it in place, a suitable yielding gasket or cushioning member 18 being provided. Any other suitable means may be employed for holding the conically recessed member 15 in place.

Figure 3:
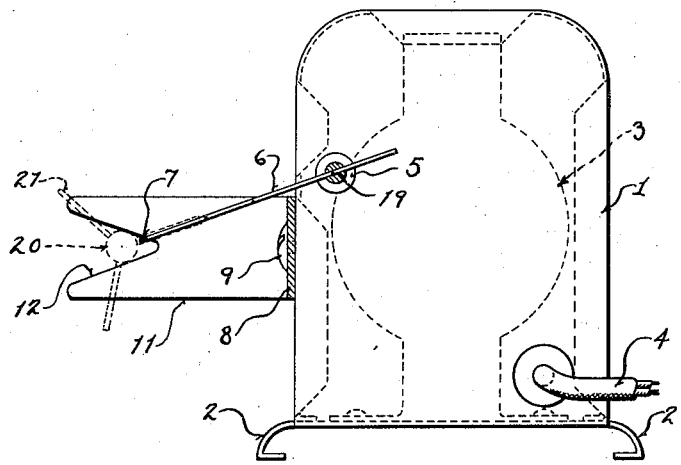
Figure 3 is a sectional view approximately on the line 3—3 of Figure 2.

It is to be noted that the side arms 6 of the trimming member are received in openings 19 formed in the binding posts or holding members 5 as shown in Figure 3. The holes 19 through the members 5 are arranged in approximate alignment with the axis of the shaft 20 of the arrow.

It is to be understood that the members 5 are insulated in any suitable manner from the metal housing 1 and are rigidly mounted thereon. They, therefore, constitute terminals for the low voltage secondary and at the same time constitute guiding and holding members for adjustably holding the trimming member in any desired position towards or from the shaft of the arrow. It is to be noted, however, that in all positions of adjustment of the trimming member, that such trimming member lies substantially in a plane passing through the axis of the shaft of the arrow.

It is to be noted also that the relatively heavy transformer is securely fastened within the casing 1 and in addition to functioning as a stepdown transformer also provides a relatively heavy weight to hold the unitary assembly in position against tipping when arrows are inserted or removed from the arrow holding frame 8.

Figure 2:
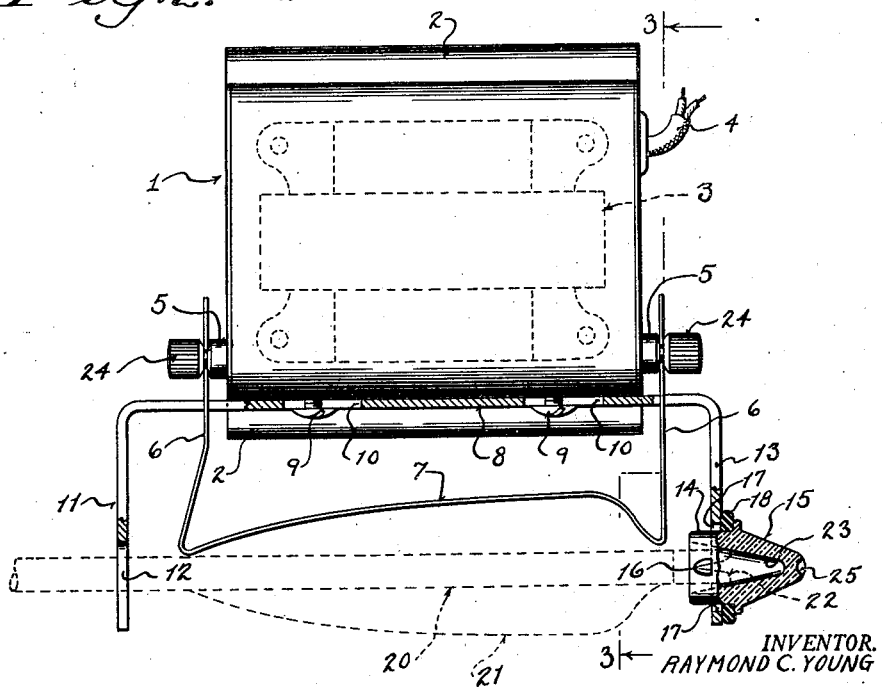
Figure 2 is a plan view with parts broken away and parts in section.

In using the device the arrow with its feathers 21 is positioned as shown in Figures 2 and 3. The nock end indicated at 22 of the arrow is fitted within the conical recess 23 of the member 15 and is notched. The shaft 20 is received in the notch 12 of the arm 11. The transformer is connected to a suitable source of alternating current, for example, the house mains, and the trimming member 7 is accordingly heated so as to trim the feathers by burning when the shaft 20 is rotated. It is apparent from an examination of Figure 2 that as the shaft 20 of the arrow is rotated, each feather is accordingly trimmed to the exact contour of the trimming member 7.

Any number of arrows may have their feathers trimmed to exactly the same shape provided the same member 7 is employed and the same adjustment of the parts is used. If it is desired, it is apparent that the nuts 24 of the binding posts 5 may be loosened and the member 7 may be adjusted inwardly or outwardly to the exact position desired. Also it is clear that the frame 8 may be adjusted to the right or to the left of its position shown in Figures 1 and 2 by loosening the screws 9 and thereafter tightening them when the frame 8 is in its correct position. Thus adjustment is provided to take care of any position that the feathers 21 may be mounted on the shaft 20 of the arrow. In addition to this, the nock of the arrow is centered automatically by means of the conical recess 23 of the member 15. By having the member 15 transparent it is clear that the operator can exactly determine whether or not the nock of the arrow is as far in the conical recess 23 as it should be.

Figures 4, 6:
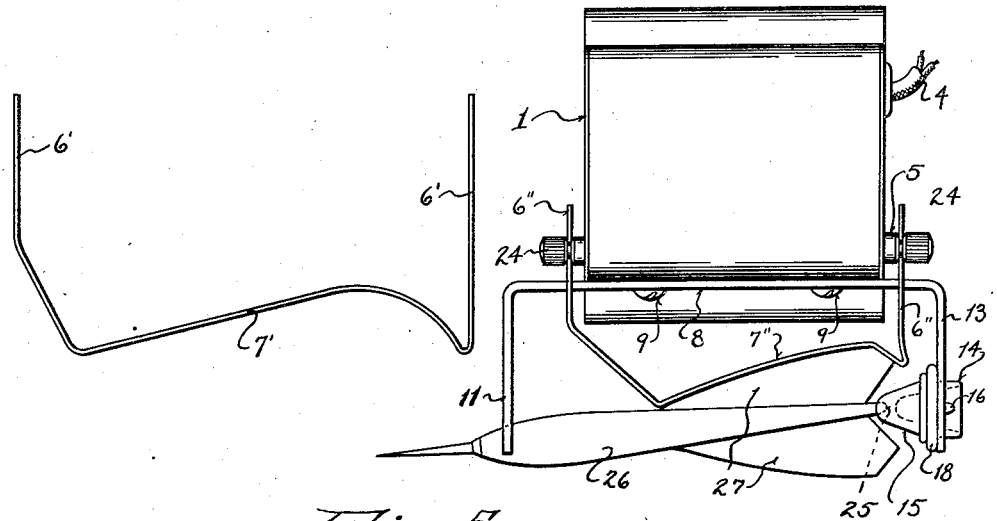
Figure 4 is a view of one of many possible forms of trimming members.
Figure 6 is a view corresponding to Figure 2 showing the device when it is used for trimming the feathers of a dart.
Figure 5:
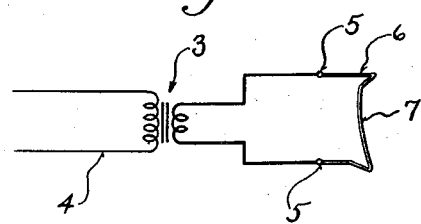
Figure 5 is a wiring diagram.

It is to be distinctly understood that other shapes of trimming members may be employed. For example, any one of a plurality of trimming members, as shown in Figure 4 and indicated by the reference character 7', may be employed depending on the particular shape that it is desired to impart to the feather.

In each case, however, the trimming members are provided with parallel arms 6' corresponding to the parallel arms 6 and all of the parallel arms are equally spaced so that any trimming members may be selectively employed with the remainder of the device.

It is to be noted that the member 15 is also provided with a recess 25 in its end as shown in Figure 2. This recess is not used for arrows but is used when it is desired to trim the feathers of darts. For instance, a dart has been shown in Figure 6, the body portion being indicated by the reference character 26 and its feathers by the reference character 27. The member 15 is reversed in Figure 6 from its position shown in Figure 2. This is readily accomplished by turning the member 15 a quarter turn so that its projections 16 will slip through the opening 17, see Figure 2. Thereafter the member 15 is positioned as shown in Figure 6 and again given a quarter turn to lock it in place. This places the hole or recess 25 in position to receive the rear end of the dart. A suitably shaped trimming member 6", 7" is employed to give the desired shape to the feathers of the dart.

It will be seen that a unitary simple type of feather trimming device for arrows, darts or the like has been provided by this invention which may be accurately adjusted to accommodate any type of arrow or dart. It is also apparent that any desired contour may be given the feathers by selecting the appropriate trimming member. The radial dimension of the feather measured outwardly from the axis of the arrow or dart is determined by the inward or outward adjustment of the trimming member and, as stated, the contour of the feathers may be determined by selecting the proper trimming member as the trimming members are interchangeably used with the apparatus.

It is to be noted also that all parts of the electrical apparatus are enclosed with the single exception of the trimming member which trimming member is in a low voltage circuit and does not endanger the user.

It will be seen that a novel feather trimmer device has been provided by this invention which is easy to operate, which is of compact construction, and which is substantially foolproof.

Although this invention has been described in considerable detail, it is to be understood that such description is intended as illustrative rather than limiting, as the invention may be variously embodied and is to be interpreted as claimed.

I claim:

1. A feather trimmer for missiles comprising a unitary structure, a trimming member contoured to provide the desired outline of the feathers, means for electrically heating said trimming member, means for holding the shaft of a missile in position to trim the feathers as the shaft is rotated, and holding means for detachably and adjustably holding said trimming member, whereby said trimming member may be adjusted radially towards or from the axis of the shaft of the missile.

2. A feather trimmer for missiles comprising a unitary structure, a trimming member contoured to provide the desired outline of the feathers, means for electrically heating said trimming member, means for holding the shaft of a missile in position to trim the feathers as the shaft is rotated, and holding means for detachably and adjustably holding said trimming member, whereby said trimming member may be adjusted radially towards or from the axis of the shaft of the missile, said holding means and said trimming member coacting in all positions of adjustment of said trimming member to maintain said trimming member substantially in the plane of the axis of the shaft of the missile.

3. A feather trimmer for arrows comprising a step-down transformer having a primary adapted for connection with a source of electric current and having a low voltage secondary, a casing surrounding said transformer and having a pair of clamping terminals provided with holes and connected to the secondary, a frame adapted to revolubly hold the shaft and nock of an arrow with the feathers on the arrow spaced from the frame, and a trimming member having parallel side arms adjustably received in the holes of the terminals and arranged to be clamped by said terminals in adjusted position and having a contoured portion adapted to be heated by said secondary to trim by burning the feathers of the arrow as said arrow is rotated.

4. A feather trimmer for missiles comprising a casing having relatively widely spaced base portions, a step-down transformer located within said casing and providing weight to prevent inadvertent tipping of said casing, a frame rigid with said casing for revolubly supporting a missile, and a feather trimming member arranged to be heated from the low voltage winding of said transformer and adapted to trim the feathers of the missile when the missile is rotated in said frame.

5. A feather trimmer for arrows comprising a unitary assembly including a casing, a frame adjustably carried by said casing and having a pair of arms one of which is notched to receive the shaft of an arrow and the other of which is provided with a conically recessed member arranged to receive and center the nock of the arrow, and an electrically heated trimming member supported from the casing and arranged to trim the feathers of the arrow as the arrow is rotated in the frame.

6. A feather trimmer for arrows comprising a unitary assembly including a casing, a frame adjustably carried by said casing and having a pair of arms one of which is notched to receive the shaft of an arrow and the other of which is provided with a transparent, conically recessed member arranged to receive and center the nock of the arrow, and an electrically heated trimming member supported from the casing and arranged to trim the feathers of the arrow as the arrow is rotated in the frame.

7. A feather trimmer for arrows and darts comprising a unitary assembly, including a casing, a frame adjustably carried by said casing and having a pair of arms, one of which is notched to receive the shaft of an arrow or the body of a dart, the other of which is provided with a reversible and detachably held member having a conical recess opening from one side of such member and adapted to receive and center the nock of an arrow and the other end of said member having a shallower recess adapted to receive the rear end of a dart, and an electrically heated trimming member supported from the casing and arranged to trim the feathers of an arrow or a dart as such arrow or dart is rotated in the frame.

RAYMOND C. YOUNG.